United States Patent [19]

Littleton

[11] Patent Number: 4,850,531
[45] Date of Patent: Jul. 25, 1989

[54] DRIP EMITTER

[75] Inventor: Kermit R. Littleton, Julian, Calif.

[73] Assignee: James Hardie Irrigation, Inc.

[21] Appl. No.: 150,616

[22] Filed: Feb. 1, 1988

[51] Int. Cl.⁴ .......................... B05B 15/00; B05B 17/00
[52] U.S. Cl. ........................................ 239/1; 239/542; 239/547; 239/272
[58] Field of Search .................. 239/1, 542, 547, 272, 239/464

[56] References Cited

U.S. PATENT DOCUMENTS

| 3,804,334 | 4/1974 | Curry . | |
|---|---|---|---|
| 3,833,176 | 9/1974 | Caldwell . | |
| 3,851,896 | 12/1974 | Olson | 239/542 |
| 3,874,598 | 4/1975 | Havens | 239/542 |
| 3,981,452 | 9/1976 | Eckstein . | |
| 4,209,133 | 6/1980 | Mehoudar | 239/542 |
| 4,281,798 | 8/1981 | Lemelstrich | 239/542 |
| 4,519,546 | 5/1985 | Gorney et al. . | |
| 4,533,083 | 8/1985 | Tucker . | |
| 4,573,640 | 3/1986 | Mehoudar . | |

FOREIGN PATENT DOCUMENTS 1068073  1/1984  U.S.S.R. .............................. 239/542

Primary Examiner—Andres Kashnikow
Assistant Examiner—Patrick N. Burkhart
Attorney, Agent, or Firm—Gordon L. Peterson; Loyal M. Hanson

[57] ABSTRACT

An emitter includes a body member having a head portion. The head portion has an outer peripheral surface that defines an elongated channel and the channel extends along a tortuous path from an inlet end of the channel to an outlet end of the channel. A cover of heat shrinkable material is shrunk over the outer peripheral surface of the head portion covers the channel to form a turbulent flow passage. The head portion may include generally opposed, first and second transverse surfaces between which the outer peripheral surface extends, the cover extending partially over the transverse surfaces to form flanges that engage the transverse surfaces. The heat shrinkable material may be shrinkable both axially and circumferentially for this purpose. One embodiment includes an emitter outlet in the form of an annular basin that is fed with a non-radially disposed slot to produce a self-cleaning vortex action.

12 Claims, 2 Drawing Sheets

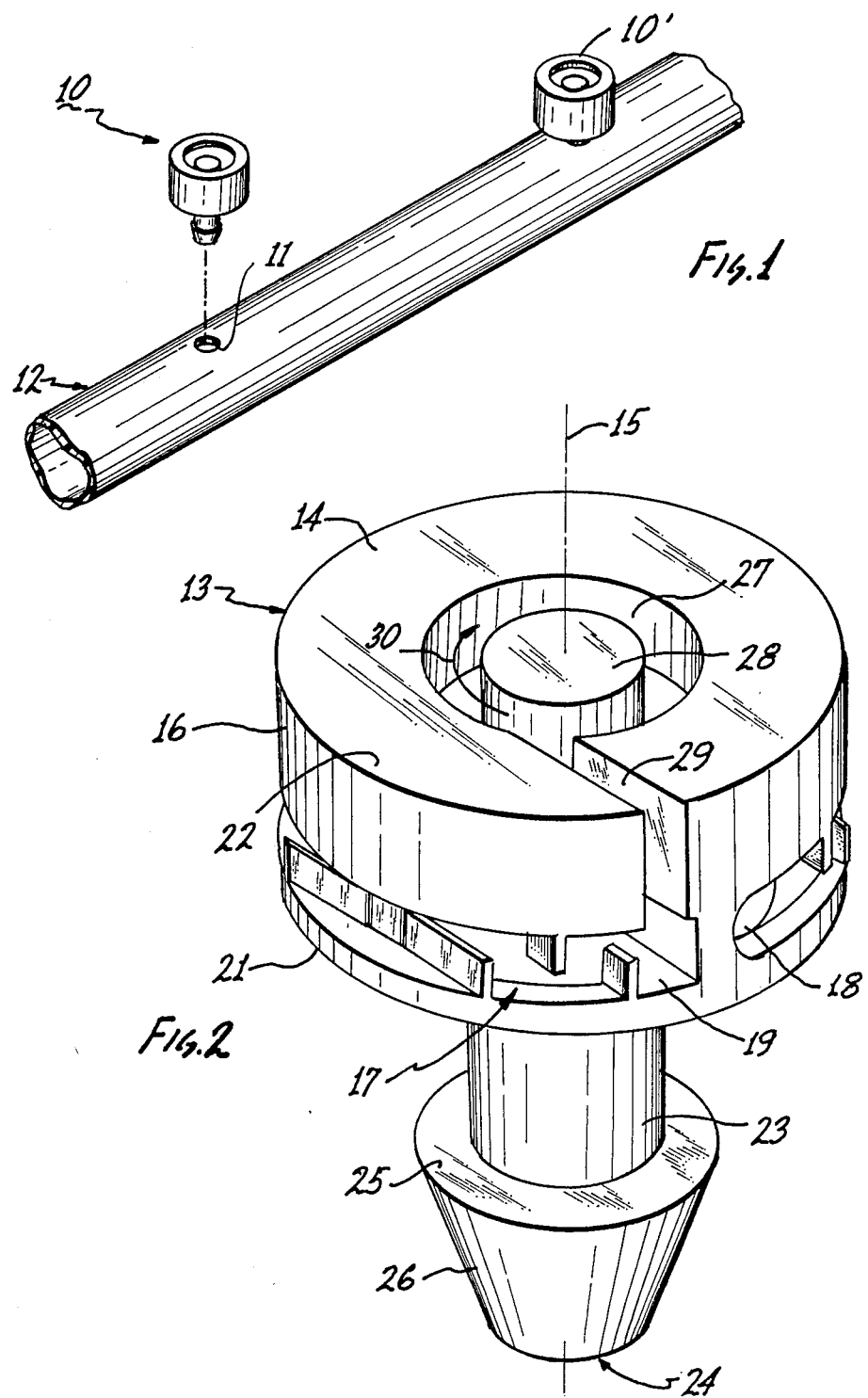

DRIP EMITTER

BACKGROUND OF THE INVENTION

1. Technical Field

This invention relates generally to irrigation equipment, and more particularly to a new and improved emitter for drip irrigation applications.

2. Background Information

Rather than spraying water over a field of crops, drip irrigation equipment supplies the water drip-by-drip near the roots where it does the most good. Some drip irrigation accomplishes this with water emitting devices or emitters that are mounted at spaced apart locations along a supply tube. The emitters control the flow of water so that it discharges very slowly.

Existing emitters for this purpose may include an emitter body that may be cylindrically shaped and about two centimeters in diameter, for example. A stem extends axially from the emitter body for insertion through a hole in the supply tube and a barb on the stem engages the tube. Using a supply of these emitters, a user inserts them at selected locations along the tube to achieve the desired irrigation, at twenty centimeter intervals, for example.

The stem defines an emitter inlet through which water flows from the supply tube into the emitter. There, the water flows along a turbulent flow passage to an emitter outlet. As this happens, the turbulent flow passage dissipates flow energy (reduces the water pressure) so that the water drips out slowly at a desired rate, and it is the structure defining the turbulent flow passage in existing emitters that could be improved.

The turbulent flow passage in some existing emitters, for example, is cooperatively defined by three injection molded members. A first member (that may be disc-shaped, for example) includes a channel in opposing faces of the disc that extends along a tortuous path. The second and third members screw or snap together over the first member to cover the channel and thereby form a water tight turbulent flow passage. However, three injection molded components are required.

Another existing emitter reduces the number of components from two to three by using a barrel-shaped member having a channel in its outer peripheral surface. The channel is covered with another molded member that fits tightly over the barrel-shaped member. This arrangement forms the desired turbulent flow passage with just two components, but they are tightly fitting injection molded components.

Thus, existing emitters may involve components that are somewhat complicated, costly, and inconvenient to fabricate. In addition, the fit may deteriorate as water pressure increases. Consequently, it is desirable to have a new and improved emitter that alleviates these concerns.

SUMMARY OF THE INVENTION

This invention solves the problems outlined above by utilizing a length of heat shrinkable material as the channel covering component. This two-component approach is less complicated. It is less costly. The emitter is more conveniently fabricated, and the heat shrinkable material provides the tight fit desired.

Generally, an emitter constructed according to the invention includes a body member having a head portion. The head portion has an outer peripheral surface that defines an elongated channel, and the channel extends along a tortuous path from an inlet end of the channel to an outlet end of the channel.

According to a major aspect of the invention, there is provided a cover of heat shrinkable material shrunk over the outer peripheral surface of the head portion to cover the channel and form a turbulent flow passage. The cover forms a tightly fitting sheath.

According to another aspect of the invention, there is provided a head portion that includes generally opposed, first and second transverse surfaces between which the outer peripheral surface extends, and the cover is configured to extend partially over the first and second transverse surfaces to form first and second flanges. These engage the transverse surfaces, the heat shrinkable material of the cover being heat shrinkable both axially and circumferentially for this purpose.

According to yet another aspect of the invention, there is provided an outlet arrangement that serves as self-cleaning means for reducing the accumulation of particulate material in the emitter outlet. The emitter outlet is in the form of an annular basin for this, and it is fed with a non-radially disposed slot that results in a self-cleaning vortex action.

In line with the above, a method of making an emitter includes the steps of providing a body member similar to that described above. It includes a head portion that has an outer peripheral surface and it defines an elongated channel in the outer peripheral surface that extends along a tortuous path from an inlet end of the channel to an outlet end of the channel. The method includes placing a cover of heat shrinkable material over the outer peripheral surface to cover the channel, and shrinking the heat shrinkable material over the outer peripheral surface of the head portion so that the cover tightly grips the head portion to form a turbulent flow passage.

The above mentioned and other objects and features of the invention and the manner of attaining them will become apparent, and the invention itself will be best understood, by reference to the following description taken in conjunction with the accompanying illustrative drawings.

BRIEF DESCRIPTION OF THE DRAWINGS

FIG. 1 of the drawings is a perspective view of two emitters constructed according to the invention, one mounted within a hole in a section of supply tube and the other in a position to be mounted;

FIG. 2 is an enlarged perspective view of the emitter body;

DESCRIPTION OF THE PREFERRED EMBODIMENTS

Figure 3:
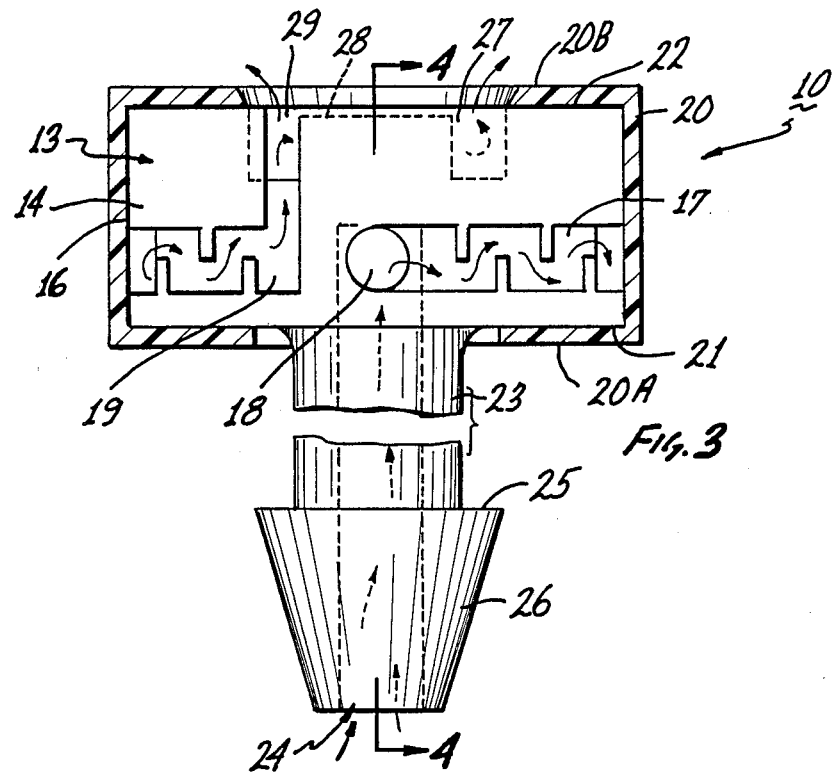
FIG. 3 is an enlarged elevational view of the emitter with the stem foreshortened and portions of the cover in cross section.

Referring now to the drawings, there is shown and emitter 10 constructed according to the invention. It is shown in FIG. 1 in a position to be mounted in a hole 11 of a supply tube 12. Once mounted, it would appear like the emitter 10' that is also shown in FIG. 1.

Generally, the emitter 10 includes a body member 13 having a head portion 14 (FIG. 2). It may be composed of an injection molded thermoplastic material, for example. The body member 13 includes a head portion 14 that is cylindrically-shaped as illustrated about an axis 15 and approximately one and one-quarter centimeters in diameter. Other shapes and sizes may be employed, however, within the broader inventive concepts disclosed.

Figure 4:
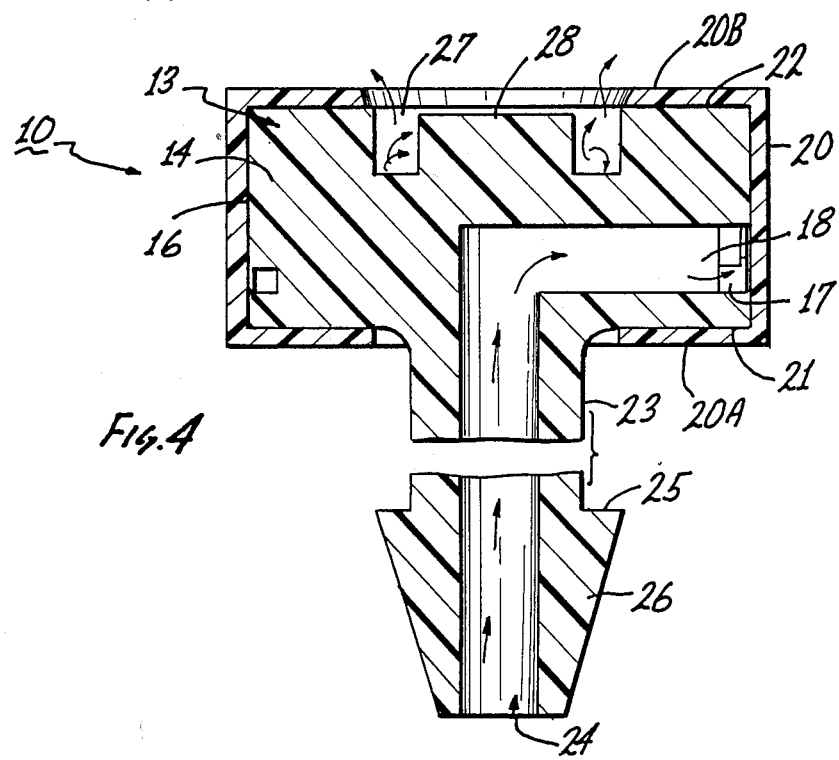
FIG. 4 is a cross sectional view taken on line 4—4 of FIG. 3.

The head portion 14 includes an outer peripheral surface 16 that defines an elongated channel 17, the outer peripheral surface 16 being cylindrically-shaped. The channel 17 extends along a tortuous path (i.e., one that changes direction frequently) from an inlet end 18 of the channel 17 to an outlet end 19 of the channel 17 and it is covered with a cover 20 (FIGS. 3 and 4). The channel 17 and cover 20 provide a turbulent flow or pressure reducing passage.

In other words, the channel 17 is configured according to known techniques to agitate the flow of water along the passage formed by the channel 17 and the cover 20. This is depicted by the arrows in FIG. 3 and it results in the dissipation of flow energy and reduction of water pressure. It serves as means for defining a pressure reducing passage extending through the emitter 10.

This invention accomplishes the above with a cover 20 composed of a heat shrinkable material. The heat shrinkable material may be of a known type that is at least shrinkable circumferentially. It may include an extruded polyethylene tube, for example, that is processed according to known techniques to achieve the heat shrinkable attributes. The cover 20 is placed over the outer peripheral surface 16 and shrunk circumferentially so that it covers the channel 17 and tightly grips the head portion 14 to form a turbulent flow passage.

Preferably, the head portion 14 includes first and second transverse surfaces 21 and 22 that extend in planes generally perpendicular to the axis 15 (FIG. 2) and the heat shrinkable material of which the cover 20 is composed is shrinkable both axially and circumferentially. The cover 20 is placed over the outer peripheral surface 16 and positioned so that it extends beyond the transverse surfaces 21 and 22. Then, the heat shrinkable material is shrunk both axially and circumferentially by the application of heat.

This results in the cover 20 shrinking to the configuration illustrated in FIGS. 3 and 4, with a first flange portion 20A of the cover 20 gripping the first transverse surface 21 and a second flange portion 20B of the cover 20 gripping the second transverse surface 22. In other words, the heat shrinkable cover 20 conforms to and tightly engages the head portion 14.

Stated another way, the head portion 14 includes generally opposed, first and second transverse surfaces 21 and 22 between which the outer peripheral surface 16 extends, and the cover 20 extends partially over the first and second transverse surfaces 21 and 22 to form first and second flanges 20A and 20B that engage the first and second transverse surfaces 21 and 22.

A stem 23 extends axially away from the first transverse surface 21. It may be about one centimeter long, for example, and it is dimensioned and arranged to be inserted through the hole 11 in the supply tube 12. The stem 23 defines and emitter inlet 24 in fluid communication with the inlet end 18 of the channel 17 so that with the stem 23 inserted in the hole 11 of the supply tube 12 (FIG. 1), water under pressure passes from the supply tube 12 through the emitter inlet 24 to the channel 17, while a radially-extending annular surface 25 on a barb portion 26 of the stem 23 engages the supply tube 12 to prevent the emitter 10 becoming dislodged.

In addition, the head portion 14 defines an emitter outlet in the form of an annular basin 27 in the second transverse surface 22 through which water is discharged from the emitter 10. The annular basin 27 circumscribes a post 28 that is a portion of the head portion 14, and a slot 29 in the head portion 14 extends from the outlet end 19 of the channel 17 to the annular basin 27. The slot 29 extends toward the annular basin 27 nonradially in the sense that the slot 29 extends generally along a line that does not intersect the axis 15 (FIG. 2).

This results in a vortex action as water flows from the channel 17 along the slot 29 into the annular basin 27. In other words, the water circulates in the direction of an arrow 30 in FIG. 2 and this arrangement serves as self-cleaning means for reducing the accumulation of particulate material in the emitter outlet.

In operation, the stem 23 of the emitter 10 is inserted in the hole 11 in the supply tube 12, with the annular surface 25 of the barb 26 engaging the supply tube 12. Water under pressure flows through the supply tube and into the emitter inlet 24. From there the water flows to the inlet end 18 of the channel 17, along the turbulent flow passage formed by the channel 17 and the cover 20, and on to the outlet end 19 of the channel 17, water pressure reducing along the way.

Next, the water flows through the slot 29 into the annular basin 27 where it circulates around the post 28. Then, the water discharges drip-by-drip (i.e., at a slow rate) from the annular basin 27.

Thus, the emitter 10 utilizes a length of heat shrinkable material in a novel two-component approach. It is less complicated. It is less costly. The emitter is more conveniently fabricated, and the shrink tubing provides the tight fit desired.

Although an exemplary embodiment of the invention has been shown and described, many changes, modifications, and substitutions may be made by one having ordinary skill in the art without necessarily departing from the spirit and scope of this invention.

What is claimed is:

1. A method of making an irrigation emitter comprising:
   providing an emitter body having a stem and a head portion with generally opposed transverse surfaces, an outer peripheral surface, an open, elongated channel in the peripheral surface, an inlet, an outlet and a passage which includes the channel extending between the inlet and the outlet with the stem projecting from the head;
   placing a tubular cover of heat shrinkable material over the outer peripheral surface to cover the channel;
   shrinking the heat shrinkable material over the outer peripheral surface of the head portion so that the stem projects from the cover and the cover tightly grips the head portion to close the channel; and
   said step of shrinking being carried out to produce first and second flanges on the cover that tightly engage the transverse surfaces, respectively, of the head portion.

2. A method as recited in claim 1, wherein:
   the heat shrinkable material is heat shrinkable both axially and circumferentially; and
   the step of shrinking includes shrinking the heat shrinkable material both axially and circumferentially.

3. An emitter comprising:

an emitter body having a stem and a head portion with generally opposed transverse surfaces, an outer peripheral surface, and an elongated, open channel in said peripheral surface;

a cover of heat shrinkable material shrunk over the head portion and closing said channel, said cover having first and second flanges engaging the transverse surfaces whereby the cover grips the head portion;

said stem being coupled to said head portion and projecting beyond said cover; and means including said channel for defining a pressure reducing passage extending through the emitter, said passage extending into said stem and having an inlet for receiving water under pressure and an outlet for discharging water from the emitter.

4. An emitter as recited in claim 3, wherein:

the heat shrinkable material of the cover is heat shrinkable both axially and circumferentially; and the cover is heat shrunk both axially and circumferentially so that the cover tightly grips the head portion.

5. An emitter as recited in claim 3, wherein:

the stem is dimensioned and arranged to be inserted through a hole in a supply tube, the stem extending axially from one of the transverse surfaces and defining an emitter inlet in fluid communication with the channel.

6. An emitter as recited in claim 3, wherein:

the head portion defines an emitter outlet in one of the transverse surfaces that is in fluid communication with the channel.

7. An emitter as recited in claim 6, wherein the head portion includes:

self-cleaning means for reducing the accumulation of particulate material in the emitter outlet.

8. An emitter as recited in claim 7, wherein:

the emitter outlet is in the form of an annular basin; and the self-cleaning means includes a slot that extends from the outlet end of the channel to the annular basin, the slot being disposed non-radially relative to the basin so that water flowing through the slot to the annular basin produces a vortex action.

9. An emitter as defined in claim 8 wherein the cover terminates so as not to obstruct water flow out of the annular basin.

10. An emitter, comprising:

an emitter body having a stem and an enlarged head portion with generally opposed transverse surfaces, an outer peripheral surface, and an elongated, open channel in said peripheral surface;

said stem being coupled to said head portion and extending axially from one of said transverse surfaces;

a cover of heat shrinkable material shrunk over the head portion and closing said channel, said cover having opposite ends and first and second flanges which extend to said ends, respectively, said flanges engaging the transverse surfaces and terminating along the transverse surfaces whereby the cover grips the head portion; and means including said channel for defining a pressure reducing passage extending into said stem and having an inlet for receiving water under pressure and an outlet for discharging water from the emitter.

11. An emitter as recited in claim 10, wherein:

the heat shrinkable material of the cover is heat shrinkable both axially and circumferentially; and the cover is heat shrunk both axially and circumferentially to tightly grip the head portion.

12. An emitter as recited in claim 10, wherein:

the outer peripheral surface of the head portion is generally cylindrically shaped.

* * * * *